July 28, 1942. C. B. MOORE 2,290,987
AIR CONTROL INSTRUMENT
Filed Aug. 16, 1939
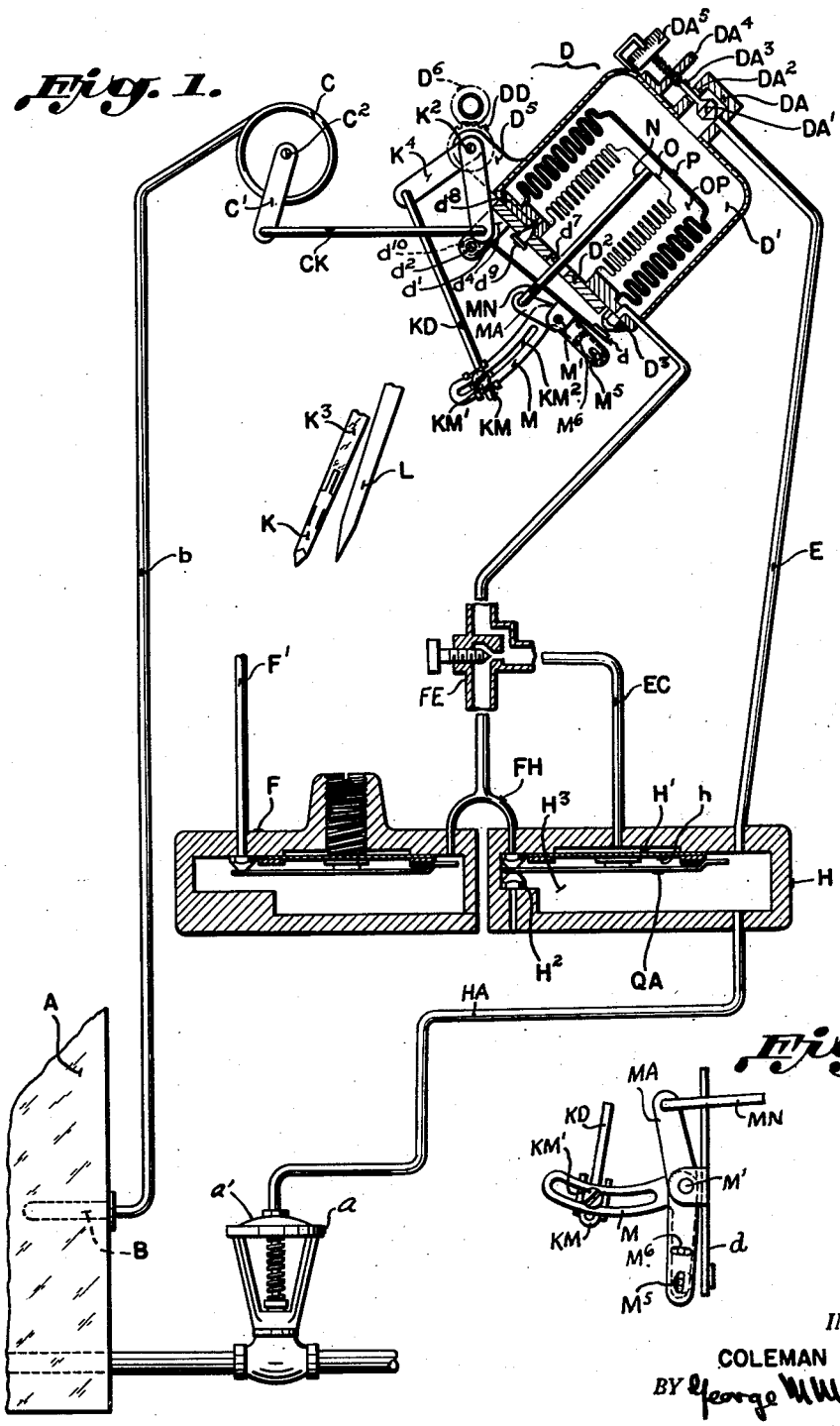
INVENTOR.
COLEMAN B. MOORE
BY George W. Wurzburg
ATTORNEY Patented July 28, 1942

2,290,987

UNITED STATES PATENT OFFICE 2,290,987

AIR CONTROL INSTRUMENT

Coleman B. Moore, Carroll Park, Pa., assignor to The Brown Instrument Company, Philadelphia, Pa., a corporation of Pennsylvania Application August 16, 1939, Serial No. 290,528

8 Claims. (Cl. 236—82)

The general object of the present invention is to provide improved control apparatus of the type comprising what may be called an air controller, by means of which variations in a measurable controlling condition produce predetermined changes in a pressure fluid, ordinarily air under pressure, which thus forms a control force, which in magnitude is a definite function of the controlling condition, and which may be employed directly, or more usually through a relay mechanism, to vary some controlled condition, which may or may not react upon the controlling condition. Such control apparatus has a wide range of use, as the controlling condition may be any condition, such as temperature, pressure or velocity, for example, constituting or creating a measurable force or action.

More specific objects of the present invention are to provide improvements in the mechanism by which the fluid pressure control force is regulated or varied in accordance with variations in the controlling condition, those improvements being partly mechanical and of especial importance from the standpoint of mechanical simplicity and effectiveness, but also including novel provisions contributing to a sensitive or quickly responsive regulatory action, and to a reduction in the hunting tendency which sensitive regulatory action ordinarily tends to produce.

Still more specifically it is an object of the invention to provide means whereby the control mechanism may be adjusted for particular requirements of service. In fluid pressure actuated control apparatus of the type with which this invention is concerned, an element sensitive to a variable condition such as temperature, is adapted to vary the pressure upon a fluid motor such as a fuel valve, governing the condition such as temperature, or governing some related condition. For different processes the relation of condition change to corrective action sometimes referred to as the "throttling range" or sensitivity of the control apparatus, is necessarily different. The present invention provides means for ready adjustment of this relation including an adjustable needle valve whereby the control pressure changes in response to a given condition variation may be different for different adjustments of the valve.

The various features of novelty which characterize my invention are pointed out with particularity in the claims annexed to and forming a part of this specification. For a better understanding of the invention, however, and the advantages possessed by it, reference should be had to the accompanying drawing and descriptive matter in which I have illustrated and described a preferred embodiment of the invention.

In the drawing Figure 1 is a view of the entire control system and Figure 2 is an enlarged view of the flapper actuating mechanism.

The particular form of control system diagrammatically shown by way of example in the drawing, is adapted to adjust a fuel supply valve or other controller $a$, to thereby regulate the supply of heat to a furnace A as required to maintain an approximately constant furnace temperature which is measured by an expansion fluid thermometer of which B is the temperature responsive bulb or chamber. The fluid pressure in chamber B, which increases and decreases as the furnace temperature rises and falls, is transmitted by a conduit $b$ to a pressure responsive element C, shown as a Bourdon tube of helical form having its stationary end connected to the conduit $b$, and having its movable end secured to an arm $C'$, which is pivoted to turn about an axis $C^2$, clockwise or counter-clockwise, as the pressure in the tube rises or falls.

Through suitable connections, the oscillations of the arm $C'$ give motion to the valve $d$, which, as shown, forms a part of a control pressure regulator or air controller unit D, and regulates the escape of air from, and thereby regulates the control air pressure in the regulator chamber $D'$. The latter receives air through a pipe E, that is supplied from the controlled chamber in a booster valve H to be described below.

The booster valve H is supplied with air under regulated pressure from regulator F through pipe FH. This air is supplied to a nozzle disposed opposite an exhaust nozzle $H^2$ and a valve member QA is provided to cooperate with both nozzles and govern the pressure in the chamber $H^3$ in accordance with the position of the valve member. The valve QA is controlled by a diaphragm $h$ which the valve continuously tends to abut by virtue of its spring hinge mounting to the stationary unit. The spring hinge mounting for the valve QA merely serves to keep the valve against the diaphragm $h$ so that any movement of the latter is transferred to the valve. The mounting of the valve places only a negligible force on the diaphragm $h$. Diaphragm $h$ is subjected to opposing pressures namely that existing in chamber $H'$ which is in unrestricted communication through pipe EC with a nozzle $D^3$ and that existing in chamber $H^3$ of the unit H. The pressure in chamber $H^3$ will thereby be maintained substantially equal to the pressure in line EC. Pipe Ha connects the chamber $H^3$ with the control valve chamber $a'$.

All the above-mentioned parts, except the furnace A, valve $a$ and bulb B, are advantageously combined in a control instrument, which may well be a recording meter similar in general form to a commercial type of meter used for recording temperature and pressure. Such a meter may includes a casing, a chart plate, chart and chart driving motor together with a hinged door not shown.

The meter pen or indicating pointer K is carried by an element $K^3$ pivoted to oscillate about an axis $K^2$. A normally adjustable index L may be set to indicate the normal temperature to be maintained or approximated. The element $K^3$ is oscillated about the axis $K^2$ through a link CK by the member $C'$, which, with the Bourdon tube C, and air controller unit D is in the meter casing.

The air controller unit D, in the preferred construction illustrated, comprises a cup-shaped casing body forming the cylindrical outer wall and one end wall of the chamber $D'$. The open end of the casing body is normally closed by an end head $D^2$ removably attached thereto. The bleeder outlet in nozzle $D^3$ is controlled by the valve $d$ and is formed by the axial passage in a bolt-like nozzle member $D^3$ threaded through an opening in the head $D^2$ and connected with line EC. This nozzle $D^3$ is in communication with the chamber $H'$ by means of the line EC, all of which are supplied with air, at a reduced pressure, from the regulator F through a variable restriction FE. The nozzle has its enlarged outer end rounded to form a convex surface facing the valve $d$ and the annular portion of which immediately adjacent the passage forms a seat for the valve $d$. The latter is in the form of a thin plate or bar which extends generally parallel to and diametrically of the end head $D^2$, with one end in front of the nozzle part $D^3$ which is located adjacent one side of the end head. The end of the valve member $d$ remote from the nozzle $D^3$ is pivotally connected to the end head $D^2$. As shown the pivotal connection comprises spaced apart transverse projections $d'$ from the valve member $d$, and a hinge shaft $d^2$ passing through those projections and through hinge lug $d^4$ carried by the end head $D^2$.

The operating connections for the valve member $d$ include a bell crank lever M pivotally connected to the member $d$ at a distance from the hinge shaft $d^2$. As shown, the lever M is carried on a pin $M'$ carried by flapper valve $d$ and is connected at its lower end by an eccentric pin $M^5$ to a lever MA that is also carried by the pin $M'$. Rotation of the eccentric pin $M^5$ will adjust the angle between M and MA and therefore the initial adjustment of the instrument. A locking means shown at $M^6$ is used to prevent relative movement between M and MA after they have been adjusted. The upper end of lever MA is connected to a link MN attached to abutment N, the purpose of which is later described. Bell crank M is connected by a link KD with the lever $K^4$, actuated by element C and is thus adapted through pin $M'$ to at times carry the valve away from the nozzle $D^3$ against the action of spring $d^{10}$, which tends to move the valve toward the nozzle. The connection KM between link KD and lever M is made manually adjustable toward and away from pivot $M'$ as shown by means of which a given angular movement of lever $K^4$ imparts an angular motion to lever M of a magnitude dependent upon said adjustment. This adjustment is effected by loosening the clamping screw $KM'$, sliding the connection KM to the desired position in a slot $KM^2$ of lever M and tightening screw $KM'$.

For purposes of adjusting the normal control point or value which the device tends to maintain the unit D may be bodily carried by a bracket $D^5$ pivot coaxially with the pivot $K^2$ and having an integral spur gear DD adapted to mesh with a second spur gear $D^6$. The tube connecting the nozzle $D^3$ to the restriction FE and the tube E are flexible enough to permit the adjustment of the unit D when the control point of the instrument is to be changed. The gear $D^6$ may be manually adjusted by a knob and the index L attached by a yoke member to gear $D^5$ may be employed to indicate the desired value.

As the element $K^4$ rotates clockwise or counterclockwise in response to an increase or decrease of pressure in the Bourdon tube C, the lever M is correspondingly oscillated, and as a result of the reaction between the lever and the abutment N, the valve member $d$ is thereby moved away from or toward the nozzle $D^3$ and consequently decreases or increases the air pressure in the chamber $D'$.

For purposes hereinafter explained, the abutment N is not stationary but is moved toward and away from the valve member $d$, following and as a result of an increase or decrease respectively in the pressure in the chamber $D'$. The abutment N is so moved as a result of the variations in the air pressure acting on the outer side of a bellows element O which is axially disposed within the device D and of which the abutment N forms a movable end wall. The end of the bellows element O remote from the abutment N is anchored to the end head $D^2$. The interior of the bellows is in free communication with the atmosphere through the center opening $d^7$ in the end head $D^2$. Surrounding the bellows O is a second bellows P which has its inner end closed and its outer end connected to the end member $D^2$. The chamber space OP between the bellows elements O and P is in restricted communication with the atmosphere through a passage $d^8$ in the end wall $D^2$, the rate of air flow through said passage being regulable. The means shown for regulating the flow through the passage $d^8$ is in the form of a grooved screw obturator $d^9$ threaded into the outer end of the passage, and throttling the latter more or less, according to the extent to which it extends into the passage.

Each of the bellows elements O and P has longitudinal resilience. In consequence each bellows has a definite length when the pressures acting on its inner and outer walls are the same. When those pressures are unequal, the extent to which the bellows is contracted if the external pressure exceeds the internal pressure, or is elongated if the internal pressure exceeds the external pressure, is that required to make the differential of the internal and external pressures acting on the bellows, equal to the opposing resilient bellows force which results from the contraction or elongation of the bellows, said resilient force of itself always tending to return the bellows to its normal or unstressed length.

On an increase in the pressure within the Bourdon tube C and a consequent movement of the part $K^4$ in the clockwise direction, the valve $d$ is moved by a corresponding distance away from the nozzle $D^3$, thereby reducing the pressure in $H'$. This pressure reduction permits the member QA to move upwardly and open the exhaust port $H^2$ in chamber $H^3$ to consequently reduce the pressure in chamber $D'$ to elongate bellows P. The first effect of its elongation is to enlarge the interbellows space OP and to reduce the pressure in the latter owing to the relatively slow inflow of air permitted by the restricted passage $d^8$. The reduction in pressure in OP elongates the bellows O. The resultant movement of the abutment N away from the end head $D^2$ moves the valve $d$ back toward the nozzle $D^3$, through link MN thereby tending to increase the pressure in chamber H' and chamber D'. In practice the mechanism is so proportioned and adjusted that the effect on the pressure in D' of a change in position of the part $K^4$ is only partially neutralized by the effect of the pressure change on the length of the bellows O. The decrease in pressure in chamber OP produces an inflow of air through the passage $d^8$ which tends to slowly bring the pressure in chamber OP into equality with the pressure of the atmosphere. As the pressure in the chamber OP builds up, the bellows O shortens and thereby moves the valve $d$ away from the nozzle $D^3$ and back towards the position into which it was moved on the original change in position of the part $K^4$, provided the latter remains stationary in the meantime. The converse of the actions just described occur on a decrease in the pressure in the Bourdon tube C and a corresponding adjustment of the part $K^4$ in the counter-clockwise direction.

While the adjustment at any time of the valve mechanism comprising the port or passage $D^3$ and member $d$, depends on the relative positions at the time of the parts $K^4$ and N, the position and movement of each of those parts is independent of the position of the other. It is to be noted, moreover, that the apparatus is so proportioned that the repulsive effect on the valve $d$ of the air flow through the port $D^3$ is too small to have any significant effect on the positions and movements of either of the parts $K^4$ and N.

From what has just been said, it will be apparent that the first effect of a change in the controlling condition and corresponding change in the part $K^4$ is to produce a corresponding initial change in the pressure in the chamber D'. This initial change in pressure in the chamber D' is automatically followed by a smaller reverse change in pressure, as the initial change effects a reversal of direction of the change in the controlling condition and the control apparatus may be adjusted so that the corresponding initial adjustment of the control valve $a$ is quick enough and great enough to produce a substantial corrective effect without giving rise to such a hunting difficulty as would exist but for the automatic reverse change in pressure in the chamber D'.

If it be assumed, for example, that an initial clockwise change of the position of the part $K^4$ occurs as a result of an increase in temperature due to a decrease in furnace load which continues for some time so that less fuel is needed than was previously required, said change may well produce a temporarily excessive initial decrease in pressure in chamber D', such that, if maintained, fuel would be supplied to the furnace more slowly than required to continuously meet the then existing demand on the furnace for heat. The extent of this decrease in pressure in D' is gauged by the movement given the valve $d$ by the expansion of the bellows O, occurring as a result of such decrease. Such initial excess in fuel reduction tends quickly to arrest the rise of the furnace temperature, and to decrease that temperature. As the furnace temperature falls, the lever $K^4$ turns counter-clockwise and the tendency to an excessive decrease in that temperature is neutralized more or less by an accompanying increase in pressure in the chamber D', resulting from the movement given the valve $d$ by the counter-clockwise motion of lever $K^4$, the magnitude of the increase being gauged by the compression of bellows O occurring as a result of such increase. The subsequent slow compression of the bellows O, as the pressure in the chamber OP approaches equality with that of the atmosphere, again tends to decrease the fuel supply to the furnace, but unless the furnace load has become still smaller in the meantime, the effect on position of the valve $d$ of such compression of the bellows O will be partially neutralized by the decrease in the furnace temperature and resultant counter-clockwise change in position of the part $K^4$. If the demand on the furnace for heat does not change after the bellows O has contracted to its normal or unflexed length, the valve $d$ will come to rest with the part $K^4$ in a position corresponding to a furnace temperature slightly higher than would exist in a stable operating condition with a larger demand on the furnace for heat.

The means through which the movements of abutment N effect follow up movements of the valve $d$ are important from the standpoint of ease of adjustment in the field, since ordinarily such adjustment is made experimentally while the instrument is in service dependent upon the process requirements. To facilitate this adjustment commonly termed the "throttling range" adjustment, I provide the unit D with a valve DA comprising a chamber receiving the valve member DA' which is adjustable between the inlet from conduit E to chamber D' and a bleeder port $DA^2$. The valve member DA' is carried by a stem $DA^3$ threaded into a stationary projection $DA^4$ and having a head $DA^5$ by which the position of the member relative the inlet and outlet ports may be regulated by hand. The head $DA^5$ may be calibrated and may cooperate with a relatively stationary index to indicate the adjustment.

As has been stated above a change in the position of the flapper $d$ causes a change in the pressure in chamber D'. If, however, the valve DA' is adjusted to entirely close the entrance of line E to the chamber D' no follow up movement of the flapper will be obtained since there can be no pressure change applied to the bellows P. Therefore, upon movement of the flapper with respect to the nozzle $D^3$ the pressure in line EC and chamber H' will either be equal to the atmosphere or at a maximum to cause complete closing or opening of the valve $a$. The instrument then operates as an "on-off" controller.

On the other hand, if the valve DA' is adjusted to completely close the bleed port $DA^2$ any change in pressure in the chamber $H^3$ will be applied in full to the bellows P so that a maximum follow up is obtained. Therefore, for each adjustment of the flapper a pressure change of maximum intensity will be applied to the bellows P, and through the interbellows space OP, to the bellows O, to provide a follow up movement to the flapper $d$. Thus it requires a large variation in the condition being measured, which is reflected in a proportionately large movement of the flapper $d$, to produce a pressure change sufficient to move the valve $a$ from its fully closed position.

From this it will be seen that the throttling range, or the percentage of full scale movement of the pen which is required to adjust the valve $a$ from fully open to fully closed position, may be changed by changing the adjustment of the valve DA'. For positions of the valve DA' between that in which line E is fully closed to that in which bleed port $DA^2$ is fully closed the pressure changes in chamber D' will be proportional to that in chamber $H^3$. Thus the follow up movement imparted to the flapper $d$, or the throttling range of the instrument, may be changed by adjusting the valve D', to facilitate such an adjustment the calibrations on the head $DA^5$ of the valve stem $DA^3$ may conveniently be made in terms of percent throttling range.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a control instrument, an element, means to move said element in response to variations in the value of a condition, mechanism operative to produce a pressure change in proportion to the movement of said element, a pressure chamber in communication with said mechanism, means operated by changes in pressure in said chamber to produce a reverse movement of said element, and means in said chamber and accessible for manual operation at any time to adjust the total response of said element to changes produced by said mechanism.

2. An air actuated controller comprising an air space, valve means regulating the pressure in said space, a device for adjusting said valve means in accordance with a control condition, and mechanism which is responsive to changes in said pressure and is actuated on a change therein to give said valve means an initial adjustment tending to reverse a change in said pressure, and a subsequent adjustment opposite in direction to said initial adjustment and which mechanism also comprises other valve means to vary the total pressure changes produced in said space for a given movement of the first valve said other valve means being accessible for operation at all times.

3. In an air actuated controller comprising an air space, valve means regulating the pressure in said space, a device for adjusting said valve means in accordance with a control condition, and mechanism which is responsive to changes in said pressure in said space to give said valve an adjustment tending to reverse said change in pressure and means to vary said change in pressure for a given movement of said valve comprising an opening in said space communicating with the source of pressure fluid that changes the pressure therein, an opening in said space communicating with the atmosphere, and adjustable means to simultaneously vary the size of said openings.

4. An air actuated controller comprising an air space, means including a pilot valve to supply air under varying pressure to said space, valve means to adjust said pilot valve and thereby said supply, means to move said valve means in response to a control condition, means responsive to changes in pressure in said space to give said valve means a movement in the opposite direction, and means to vary the last named movement for a given original movement comprising a bleed port in said space and means accessible to adjust said bleed port at will.

5. In a measuring and control instrument, the combination with a support, an element pivotally mounted thereon, a pair of independently operable means to move said element about its pivot, mechanism operated in response to movement of said element by one of said operable means to produce a control effect, means responsive to said control effect to adjust the second of said independently operable means in a direction to counteract the original movement of said element, and means to vary the counteracting movement of said element comprising a pressure chamber, variation in the pressure of which operates the second operable means, means whereby said control effects vary the pressure in said chamber and means including a valve accessible for manual operation at all times to adjust the pressure changes in said chamber for a control effect of a given value.

6. In an air control instrument, the combination of a relatively movable nozzle and flapper valve therefor, a supply of air under pressure for said nozzle, the pressure of said supply being varied in response to relative movement of said flapper and nozzle, means responsive to variations in the value of a control condition to relatively adjust said flapper and nozzle and thereby change the pressure of said supply, a chamber, mechanism therein to also relatively adjust said flapper and nozzle, a supply of pressure fluid for said chamber, variations in which actuate said mechanism, relay means to control the last mentioned pressure supply, said relay means being actuated in response to pressure changes produced as a result of relative movements of said flapper and nozzle, an opening in said chamber communicating with the atmosphere and valve means to simultaneously regulate said opening and the supply of pressure fluid to said chamber.

7. In a control instrument, the combination of a flapper and nozzle movable relative to each other, means to move said flapper in response to variations in a control condition, a chamber, mechanism located therein and responsive to variations in air pressure therein to also adjust said flapper, relay means operated in response to movement of said flapper by said moving means to adjust the pressure in said chamber, an inlet in said chamber through which fluid under pressure from the relay is applied, an outlet in said chamber communicating with the atmosphere, and valve means actuating to simultaneously open the inlet and close the outlet and vice-versa whereby more or less of the pressure is applied to the chamber.

8. In a control instrument, the combination of a flapper and nozzle, means to move said flapper relative to said nozzle in response to changes in a variable condition, a supply of air varied in response to said changes, relay mechanism including a pilot valve operated by variations in the supply of air, a chamber, a supply of air for said chamber, means operated in response to variations in pressure in said chamber to also move said flapper, a second supply of air, said pilot valve operating to vary said second supply of air and therefore the pressure in the chamber, an inlet and an outlet controlling the air for said chamber, and valve means operable to simultaneously and inversely adjust said inlet and outlet.

COLEMAN B. MOORE.